United States Patent
Guerrieri et al.

(10) Patent No.: US 8,019,024 B2
(45) Date of Patent: Sep. 13, 2011

(54) METHOD OF APPROXIMATING LOG-LIKELIHOOD RATIOS IN QAM DIGITAL TRANSMISSIONS AND RELATIVE QAM SOFT-OUTPUT DE-MAPPER

(75) Inventors: Lorenzo Guerrieri, Aosta (IT); Paola Bisaglia, Padua (IT)

(73) Assignee: Dora S.p.A., Aosta (IT)

( * ) Notice: Subject to any disclaimer, the term of this patent is extended or adjusted under 35 U.S.C. 154(b) by 727 days.

(21) Appl. No.: 12/051,146

(22) Filed: Mar. 19, 2008

(65) Prior Publication Data
US 2008/0232499 A1    Sep. 25, 2008

(30) Foreign Application Priority Data

Mar. 21, 2007  (IT) .............................. VA2007A0032

(51) Int. Cl.
*H04L 27/06* (2006.01)
(52) U.S. Cl. ....................... 375/340; 375/341
(58) Field of Classification Search .......... 375/268–269, 375/272–273, 320, 329, 261–262, 279, 308, 375/316, 323–324, 340–341, 354–356; 329/302, 329/345, 347; 714/704, 746, 749, 780, 786, 714/789, 791, 794–796, E11.004
See application file for complete search history.

(56) References Cited

U.S. PATENT DOCUMENTS

| | | | | |
|---|---|---|---|---|
| 6,377,607 | B1 * | 4/2002 | Ling et al. ...................... | 375/130 |
| 2002/0159535 | A1 * | 10/2002 | Agami et al. .................. | 375/261 |
| 2003/0102905 | A1 * | 6/2003 | Ha et al. ........................ | 329/304 |
| 2007/0019752 | A1 * | 1/2007 | Kim .............................. | 375/260 |
| 2009/0135934 | A1 * | 5/2009 | Guerrieri et al. ............... | 375/262 |
| 2009/0304114 | A1 * | 12/2009 | Burg ............................. | 375/340 |

OTHER PUBLICATIONS

Guerrieri et al., LLR-Based Bit-Loading Algorithm for the Turbo Coded HomePlug AV, Nov. 26-30, 2007, Global Telecommunications Conference, 2007. GILOBECOM '07. IEEE, pp. 140-145.*

* cited by examiner

*Primary Examiner* — Tesfaldet Bocure
*Assistant Examiner* — Lawrence B Williams
(74) *Attorney, Agent, or Firm* — Lisa K. Jorgenson; Allen, Dyer, Doppelt, Milbrath & Gilchrist, P.A.

(57) ABSTRACT

Log-likelihood ratios are approximated for encoded bits modulated with a $2^m$-ary QAM constellation. Each symbol of the constellation is identified by a respective string of m bits. The log-likelihood ratio of each bit of the m bits is approximated with a product λ of a respective factor by a respective variable D that depends on a received signal and on communication channel characteristics. The approximating includes determining a value of at least one of the variables D using a parametric nonlinear function of an equalized replica z of a respective received signal.

29 Claims, 6 Drawing Sheets

METHOD OF APPROXIMATING LOG-LIKELIHOOD RATIOS IN QAM DIGITAL TRANSMISSIONS AND RELATIVE QAM SOFT-OUTPUT DE-MAPPER

FIELD OF THE INVENTION

The present invention relates to QAM demodulators, and more particularly, to a method of approximating log-likelihood ratios for a plurality of encoded bits modulated with a QAM constellation, to a soft-output QAM de-mapper that implements the method, and to a receiver that includes the soft-output QAM de-mapper.

BACKGROUND OF THE INVENTION

Higher level quadrature amplitude modulation (QAM), together with coding, is an attractive constituent for next generation communication systems due to its high spectral efficiency [1]. Coding introduces redundancy to the information sent over the communication channels in order to correctly determine the data when errors occur in the transmission. Among coding techniques, block coding and convolutional coding are by far the most frequently used. In particular, in 1993, a new class of codes called Turbo codes, based on the parallel concatenation of two recursive convolutional codes separated by a turbo interleaver, was introduced by Berrou et al. [2], showing near Shannon limit performance. After the discovery of turbo codes, turbo-like systems based on block constituent codes (turbo product codes) [3] and on serial concatenation [4] were also introduced.

To cope with bursty noise, coding techniques are in general coupled with channel interleaving. At the transmitter the channel interleaver permutes the encoded bits before modulation and transmission. At the receiver the channel de-interleaver spreads the errors, thus making the decoder work more efficiently. As observed by Caire et al. [5] bit-interleaved coded modulation (BICM) achieves superior performance with respect to trellis coded modulation (TCM) [6] over fading channels.

In most applications, best results are obtained when soft-input decoders, e.g., soft-input convolutional decoders and turbo decoders, are employed at the receiver [5]. The decoder soft-input represents the information about the reliability of the coded bits and needs to be accurately estimated. The block which provides, from the received channel de-interleaved modulation symbols, a soft-information of the coded bits is called a soft-output (SO) de-mapper. The soft-input (SI) decoder can return a hard-output (SIHO decoder) or a soft-output (SISO decoder), depending on the considered system. In the latter case the SISO decoder is followed by a further SI block (e.g., iterative decoding [2], [3], [4]; turbo-equalization [7], [8]; iterative multi-user cancellation [9]; and iterative spatial interference cancellation [10], etc.).

Following the pioneering work of Zehavi on bit reliability [11], several authors have developed SO de-mapping algorithms specific for different communication systems [5], [12], [13].

In [14] Tosato and Bisaglia developed a simplified SO de-mapper for the 16-QAM and 64-QAM constellations of the HIPERLAN/2 standard [15]. Furthermore, they also suggested an extension to higher order QAM constellations. As noted by the authors, their proposed method (hereafter called a TOBI method) is also applicable to other systems/standards with minor changes due to, for example, different Gray coded patterns.

To better understand the addressed problem, the TOBI method is briefly introduced in the particular case of the HomePlug AV standard [16] that uses a turbo coding. The same considerations apply for other types of standards and other types of coding.

The HomePlug AV (HPAV) physical layer is shown in FIG. 1. At the transmitter, the information bits for HPAV data transmission, after scrambling, are turbo convolutionally encoded, bit-by-bit interleaved and then converted into symbols through a bit-mapper. The data symbols (belonging to unit power constellations) are serial-to-parallel converted for OFDM modulation carried out using N sub-carriers. Each of the N OFDM sub-carriers can be differently loaded, depending on the estimated signal-to-noise ratio (SNR) per sub-carrier, with one of the following modulations: BPSK, 4-QAM, 8-QAM, 16-QAM, 64-QAM, 256-QAM and 1024-QAM.

To reduce the complexity of the receiver, a suitable cyclic prefix is used to remove both inter-symbol and inter-channel interference (ISI and ICI). Finally, before an analog front end (AFE) block, which sends the resulting signal to the power-line channel, a peak limiter block is inserted to minimize the peak-to-average power ratio (PAPR).

At the receiver the signal after the AFE block is fed to an automatic gain control (AGC) and time synchronization block. For sake of simplicity, the block will be assumed to be ideal. After cyclic prefix removal and OFDM demodulation, and assuming that the cyclic prefix completely eliminates ISI and ICI, it is possible to insure a good or perfect synchronization. The channel is time invariant within each i-th OFDM symbol. The received signal $y_i[k]$ over the generic sub-carrier k can be written as:

$$y_i[k] = G_i[k]a_i[k] + n_i[k] \quad (1)$$

wherein $a_i[k]$, $G_i[k]$ and $n_i[k]$ are the transmitted symbol, the channel frequency response complex coefficient and the complex additive noise with variance $\sigma_i^2[k]$, over the generic k-th sub-carrier during the i-th OFDM symbol, respectively.

The output from the OFDM demodulator is then sent to a de-mapper, a de-interleaver, a turbo convolutional decoder and a de-scrambler to reconstruct and estimate the transmitted bits.

Let $M=2^m$ be the number of symbols $\{a=a_I+ja_Q\}$ of the generic constellation, so that m interleaved coded bits (of values 0 and 1) are mapped into the complex symbol. Let $a_i[k]=a_{I,i}[k]+ja_{Q,i}[k]$ denote the symbol transmitted over the generic k-th sub-carrier during the i-th OFDM symbol, and $\{c_{i_1}[k], \ldots, c_{i_l}[k], \ldots, c_{i_m}[k]\}$ denote the corresponding coded bit sequence. We note here that in the HomePlug AV, for square QAM constellations, the sub-sequence $\{c_{i_1}[k], c_{i_2}[k], \ldots, c_{i_{m/2}}[k]\}$ is mapped into the real part $a_{I,i}[k]$ of the QAM symbol transmitted over the generic k-th sub-carrier while the sub-sequence $\{c_{i_{m/2+1}}[k], c_{i_{m/2+2}}[k], \ldots, c_{i_m}[k]\}$ is mapped into the corresponding imaginary part. For each bit $c_{i_l}[k]$ the constellation is split into two partitions of complex symbols associated to the coded bits sequences with a '0' in position l, namely $S_l^{(0)}$ and the complementary partition $S_l^{(1)}$.

The log-likelihood ratio (LLR) of the decision bit $c_{i_l}[k]$ from the de-mapper is [14]

$$\lambda_{i_l}[k] = \ln\left(\frac{P[c_{i_l}[k] = 1 \mid y_i[k]]}{P[c_{i_l}[k] = 0 \mid y_i[k]]}\right) \quad (2)$$

$$= \ln\left(\frac{\sum_{a \in S_l^{(1)}} \exp\left(-\frac{|y_i[k] - \alpha G_i[k]|^2}{2\sigma^2}\right)}{\sum_{a \in S_l^{(0)}} \exp\left(-\frac{|y_i[k] - \alpha G_i[k]|^2}{2\sigma^2}\right)}\right)$$

wherein $S_l^{(x)}$ is the set of symbols for which the l-th bit is x (x=0, 1).

Approximating the above formula with the Max-Log approximation $$\sum_j \exp[x_j] \approx \exp(\max_j x_j) \quad (3)$$

equation (2) can be written as $$\lambda_{i_l}[k] \approx \left( \min_{\alpha \in S_l^{(0)}} (w_i[k]^2) - \min_{\alpha \in S_l^{(1)}} (w_i[k]^2) \right) \frac{|G_i[k]|^2}{2\sigma^2} \quad (4)$$

where $$w_i[k] = \left| \frac{y_i[k]}{G_i[k]} - \alpha \right| = |z_i[k] - \alpha| \quad (5)$$

and $z_i[k]=y_i[k]/G_i[k]$ represents the one-tap equalized received signal, over a generic sub-carrier k. Let us introduce the notation $$D_{i_l}[k] = \frac{1}{4} \left( \min_{\alpha \in S_l^{(0)}} (w_i[k]^2) - \min_{\alpha \in S_l^{(1)}} (w_i[k]^2) \right) \quad (6)$$

then equation (4) becomes $$\lambda_{i_l}[k] \approx D_{i_l}[k] \frac{2|G_i[k]|^2}{\sigma_i^2[k]} \quad (7)$$

The values given by equation (7) are input to the decoder, a sample architecture of which is depicted in FIG. 2, that processes them and decides which bits have been transmitted.

Before the TOBI method, the realization of the soft-output (SO) de-mapper for BICM systems was typically handled by methods which try to exactly compute equation (2). This involved expressions in which quotients of sum of exponential functions were computed although, at the end, some approximations were given [13]. Let us define:

$$w_{I,i}[k] = \Re\{z_i[k]\} - a_I = z_{I,i}[k] - a_I, w_{Q,i}[k] = \Im\{z_i[k]\} - a_Q = z_{Q,i}[k] - a_Q \quad (8)$$

where the notations $\Re\{\cdot\}$ and $\Im\{\cdot\}$ designate the real and the imaginary parts of their argument, respectively. In [14] it is demonstrated that, for square QAM constellations the computation of equation (7) can be reduced to $$\lambda_{i_l}[k] \approx D_{I,i_l}[k] \frac{2|G_i[k]|^2}{\sigma_i^2[k]} \quad l=1,2,\ldots,m/2 \quad (9)$$

$$\lambda_{i_l}[k] \approx D_{Q,i_l}[k] \frac{2|G_i[k]|^2}{\sigma_i^2[k]} \quad l=m/2+1, m/2+2, \ldots, m \quad (10)$$

where $$D_{I,i_l}[k] = \frac{1}{4} \left( \min_{\alpha_I \in S_{I,l}^{(0)}} (w_{I,i}[k]^2) - \min_{\alpha_I \in S_{I,l}^{(1)}} (w_{I,i}[k]^2) \right) \quad (11)$$

$$l=1,2,\ldots,m/2$$

$$D_{Q,i_l}[k] = \frac{1}{4} \left( \min_{\alpha_Q \in S_{Q,l}^{(0)}} (w_{Q,i}[k]^2) - \min_{\alpha_Q \in S_{Q,l}^{(1)}} (w_{Q,i}[k]^2) \right) \quad (12)$$

$$l=m/2+1, m/2+2, \ldots, m$$

$S_{I,l}^{(x)}$ contains the real parts of the complex symbols of subset $S_l^{(x)}$ for x=0, 1 and l=1, 2, ..., m/2 and $S_{Q,l}^{(x)}$ contains the imaginary parts of the complex symbols of subset $S_l^{(x)}$ for x=0, 1 and l=m/2+1, m/2+2, ..., m.

As explained in [14] the main simplification of (11) and (12) with respect to (6), lies in the fact that the two dimensional Euclidean distances from M constellation points of (6) reduce to one-dimensional Euclidean distances from $\sqrt{M}$ points of (11) and (12) allowing a significant decrease in the computational complexity.

Hereafter, the method to estimate the LLRs based on (9), (10), (11) and (12) will be referred to the Max-Log method. The Max-Log method, although it introduces significant simplifications with respect to the computation of (2), is cumbersome especially for higher order QAM constellations. For this reason, in [14], further simplified expressions are given. Below, the TOBI expressions are derived for the higher HomePlug AV constellations, namely: 64-QAM, 256-QAM and 1024-QAM, taking into account the HomePlug AV Gray pattern and the normalization factors.

TOBI 64-QAM $$D_{I,i_1}[k] = -\left| \frac{|z_{I,i}[k]|}{\sqrt{42}} - \frac{4}{42} \right| + \frac{2}{42} \quad (13)$$

$$D_{I,i_2}[k] \approx \frac{|z_{I,i}[k]|}{\sqrt{42}} - \frac{4}{42} \quad (14)$$

$$D_{I,i_3}[k] \approx \frac{z_{I,i}[k]}{\sqrt{42}} \quad (15)$$

$$D_{Q,i_4}[k] = -\left| \frac{|z_{Q,i}[k]|}{\sqrt{42}} - \frac{4}{42} \right| + \frac{2}{42} \quad (16)$$

$$D_{Q,i_5}[k] \approx \frac{|z_{Q,i}[k]|}{\sqrt{42}} - \frac{4}{42} \quad (17)$$

$$D_{Q,i_6}[k] \approx \frac{z_{Q,i}[k]}{\sqrt{42}} \quad (18)$$

TOBI 256-QAM $$D_{I,i_1}[k] = -\left| -\left| \frac{|z_{I,i}[k]|}{\sqrt{170}} - \frac{8}{170} \right| + \frac{4}{170} \right| + \frac{2}{170} \quad (19)$$

$$D_{I,i_2}[k] \approx -\left| \frac{|z_{I,i}[k]|}{\sqrt{170}} - \frac{8}{170} \right| + \frac{4}{170} \quad (20)$$

$$D_{I,i_3}[k] \approx \frac{|z_{I,i}[k]|}{\sqrt{170}} - \frac{8}{170} \quad (21)$$

$$D_{I,i_4}[k] \approx \frac{z_{I,i}[k]}{\sqrt{170}} \quad (22)$$

-continued $$D_{Q,i_5}[k] = -\left|-\left|\left|\frac{|z_{Q,i}[k]|}{\sqrt{170}} - \frac{8}{170}\right| + \frac{4}{170}\right| + \frac{2}{170} \quad (23)$$

$$D_{Q,i_6}[k] \approx -\left|\frac{|z_{Q,i}[k]|}{\sqrt{170}} - \frac{8}{170}\right| + \frac{4}{170} \quad (24)$$

$$D_{Q,i_7}[k] \approx \frac{|z_{Q,i}[k]|}{\sqrt{170}} - \frac{8}{170} \quad (25)$$

$$D_{Q,i_8}[k] \approx \frac{z_{Q,i}[k]}{\sqrt{170}} \quad (26)$$

TOBI 1024-QAM $$D_{I,i_1}[k] = -\left|-\left|-\left|\left|\frac{|z_{I,i}[k]|}{\sqrt{682}} - \frac{16}{682}\right| + \frac{8}{682}\right| + \frac{4}{682}\right| + \frac{2}{682} \quad (27)$$

$$D_{I,i_2}[k] \approx -\left|-\left|\left|\frac{|z_{I,i}[k]|}{\sqrt{682}} - \frac{16}{682}\right| + \frac{8}{682}\right| + \frac{4}{682} \quad (28)$$

$$D_{I,i_3}[k] \approx -\left|\left|\frac{|z_{I,i}[k]|}{\sqrt{682}} - \frac{16}{682}\right| + \frac{8}{682} \quad (29)$$

$$D_{I,i_4}[k] \approx \frac{|z_{I,i}[k]|}{\sqrt{682}} - \frac{16}{682} \quad (30)$$

$$D_{I,i_5}[k] \approx \frac{z_{I,i}[k]}{\sqrt{682}} \quad (31)$$

$$D_{Q,i_6}[k] = -\left|-\left|-\left|\left|\frac{|z_{Q,i}[k]|}{\sqrt{682}} - \frac{16}{682}\right| + \frac{8}{682}\right| + \frac{4}{682}\right| + \frac{2}{682} \quad (32)$$

$$D_{Q,i_7}[k] \approx -\left|-\left|\left|\frac{|z_{Q,i}[k]|}{\sqrt{682}} - \frac{16}{682}\right| + \frac{8}{682}\right| + \frac{4}{682} \quad (33)$$

$$D_{Q,i_8}[k] \approx -\left|\left|\frac{|z_{Q,i}[k]|}{\sqrt{682}} - \frac{16}{682}\right| + \frac{8}{682} \quad (34)$$

$$D_{Q,i_9}[k] \approx \frac{|z_{Q,i}[k]|}{\sqrt{682}} - \frac{16}{682} \quad (35)$$

$$D_{Q,i_{10}}[k] \approx \frac{z_{Q,i}[k]}{\sqrt{682}} \quad (36)$$

The TOBI equations show a recursive regular behavior which allows a much simpler DSP or VHDL implementation than the Max-Log method. Another important feature of the TOBI equations is their linear behavior if we neglect the absolute values.

Following the TOBI approach, several articles have appeared in the literature proposing different soft-output (SO) de-mapper realizations [17], [18], [19], or TOBI applications [20], [21] and some techniques have been proposed to exploit the recursive nature of TOBI equations [22].

In [14] it was reported that the approximations introduced by the TOBI method for the 16-QAM and 64-QAM constellations cause performances very similar to those obtainable with the Max-Log method, in the case of the HIPERLAN/2 standard.

However, the following are noted: 1) the TOBI approximations degrade as the constellation order increases. In the HIPERLAN/2 system the maximum QAM constellation order is 64, hence the TOBI approximations do not impact performance significantly because the number of symbols of the constellation is relatively small; and 2) as observed in [13], when a SISO decoder is used in an iterative decoding process, even small approximation errors can be amplified from one iteration to the next. This effect was not relevant in [14] since the considered system employed a SIHO decoder.

SUMMARY OF THE INVENTION

In view of the foregoing background, an object of the present invention is to provide a method of approximating log-likelihood ratios.

The method deals with QAM constellations, preferably higher-order constellations, such as 64-QAM, 256-QAM and 1024-QAM for flat fading channels. The method advantageously provides very good approximations of the results obtainable with the Max-Log method, without the complex implementation issues that can arise with a direct realization of the Max-Log method.

This and other objects, advantages and features in accordance with the present invention are provided because the method of approximating log-likelihood ratios for a plurality of encoded bits modulated with a $2^m$-ary QAM constellation may be carried out by approximating the log-likelihood ratio of each bit of the m bits with the product $\lambda$ of a respective factor by a respective variable D. The variable D may depend on the received signal and on the channel characteristics.

At least one of the variables D may be determined by using a nonlinear parametric function of an equalized replica Z of the respective received signal. By using such a nonlinear function, it is possible to approximate with higher precision the values obtainable with the Max-Log method than the precision of other known approximation methods. The nonlinear parametric function may be a parabolic function.

The method may be particularly suitable for forming a soft-output de-mapper. The method may also be particularly useful for a receiver employing iterative processing (e.g., iterative decoding, turbo-equalization, iterative multi-user cancellation, and iterative spatial interference cancellation etc.), since the precision on the LLR estimate is increased by soft-input-soft-output (SISO) modules.

DETAILED DESCRIPTION OF THE PREFERRED EMBODIMENTS

Figure 1:
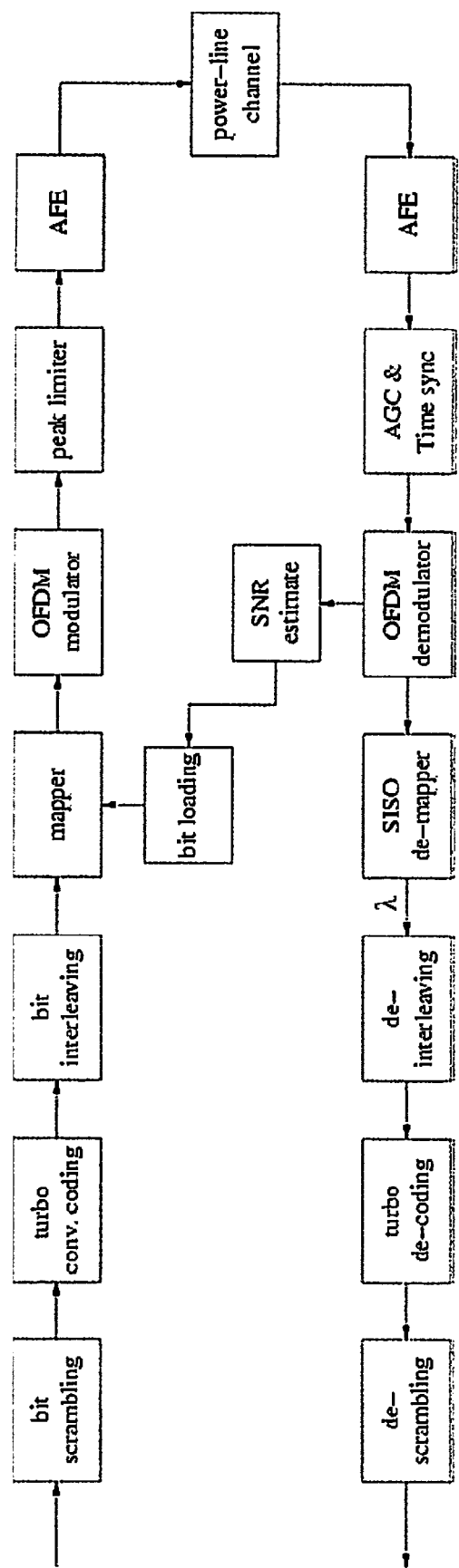
FIG. 1 is a block diagram of a HomePlug AV physical layer for data transmission according to the prior art.
Figure 2:
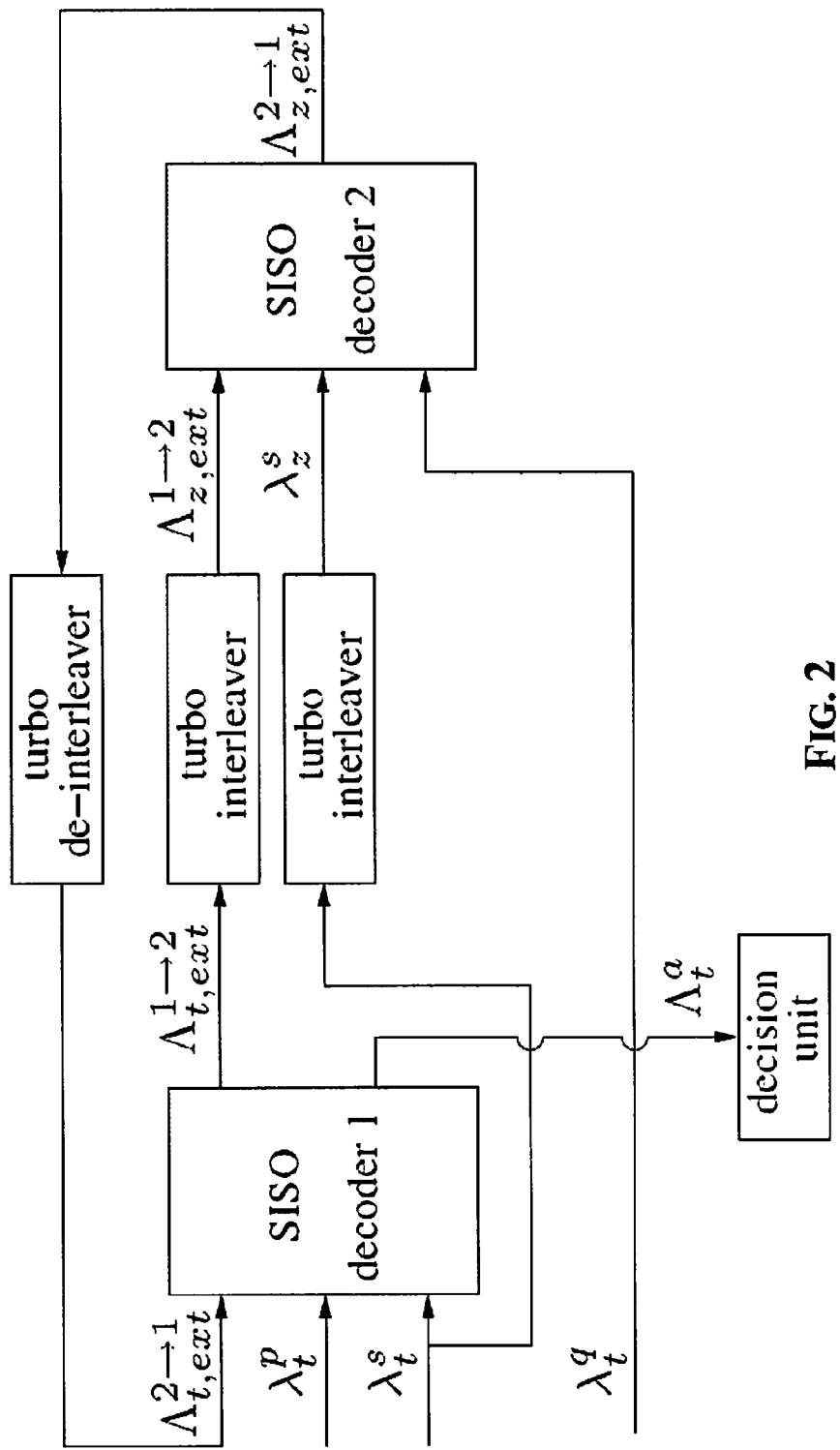
FIG. 2 is a block diagram of an iterative turbo decoder according to the prior art.

The illustrated method is particularly suitable for implementation in a SO de-mapper block for a QAM system over flat fading channels. Examples of such a system include convolutionally coded QAM with orthogonal frequency division multiplexing (OFDM) in digital video broadcasting (DVB) and HIPERLAN/2 or IEEE 802.11a/n [15], [23], [24]; turbo convolutionally coded QAM with OFDM in WiMax [25] and HomePlug AV [16][26]. Hereinafter, reference will be made to the HomePlug AV standard with turbo-coded QAM with OFDM, but what is stated holds also for other kinds of standards with different coding and for systems which employ a single carrier modulation approach.

The log-likelihood ratio of each bit of the m bits is approximated with the product λ of a respective factor by a respective variable D that depends on the received signal and on the channel characteristics. At least one variable D associated to a bit is a nonlinear function of an equalized replica $z_i[k]$ of the respective received signal $y_i[k]$. As a result, the obtained values for the variable D approximate better the values obtainable with the Max-Log method than other known approximation methods.

A sufficiently accurate approximation may be obtained by expressing the variable D of at least one bit as a parabolic function of the in phase component $z_{I,i}[k]$ (or of the quadrature component $z_{Q,i}[k]$) of the equalized replica $z_i[k]$ of the respective received signal $y_i[k]$.

The variable D of only one bit may be a linear function of the in phase component $z_{I,i}[k]$ (and of the quadrature component $z_{Q,i}[k]$) of the respective equalized replica $z_i[k]$. The variables D associated to the other bits may also be parametric parabolic functions of the respective $z_{I,i}[k]$ and $z_{Q,i}[k]$.

In the explanation that follows, expressions for the computation of $D_{I,i}[k]$ and $D_{Q,i}[k]$ for the 64-QAM, 256-QAM and 1024-QAM modulations are given, in which the nonlinear parametric function is a parabolic function, and in which certain values have been attributed to the parameters of the parametric function. Later on it will be illustrated how the following formulas may be modified.

64-QAM $$D_{I,i_1}[k] = -\left|\frac{|z_{I,i}[k]|}{\sqrt{42}} - \frac{4}{42}\right| + \frac{2}{42} \tag{37}$$

$$D_{I,i_2}[k] \approx \frac{|z_{I,i}[k]| - \frac{4}{\sqrt{42}}}{4}\left(\frac{2}{\sqrt{42}} + \left|z_{I,i}[k]| - \frac{4}{\sqrt{42}}\right|\right) \tag{38}$$

$$D_{I,i_3}[k] \approx \frac{z_{I,i}[k]}{4}\left(\frac{2}{\sqrt{42}} + |z_{I,i}[k]|\right) \tag{39}$$

$$D_{Q,i_4}[k] = -\left|\frac{|z_{Q,i}[k]|}{\sqrt{42}} - \frac{4}{42}\right| + \frac{2}{42} \tag{40}$$

$$D_{Q,i_5}[k] \approx \frac{|z_{Q,i}[k]| - \frac{4}{\sqrt{42}}}{4}\left(\frac{2}{\sqrt{42}} + \left|z_{Q,i}[k]| - \frac{4}{\sqrt{42}}\right|\right) \tag{41}$$

$$D_{Q,i_6}[k] \approx \frac{z_{Q,i}[k]}{4}\left(\frac{2}{\sqrt{42}} + |z_{Q,i}[k]|\right) \tag{42}$$

256-QAM $$D_{I,i_1}[k] = -\left|-\left|\frac{|z_{I,i}[k]|}{\sqrt{170}} - \frac{8}{170}\right| + \frac{4}{170}\right| + \frac{2}{170} \tag{43}$$

$$D_{I,i_2}[k] \approx -\frac{\left||z_{I,i}[k]| - \frac{8}{\sqrt{170}}\right| - \frac{4}{\sqrt{170}}}{4} \cdot \tag{44}$$

$$\left(\frac{2}{\sqrt{170}} + \left||z_{I,i}[k]| - \frac{8}{\sqrt{170}}\right| - \frac{4}{\sqrt{170}}\right|\right)$$

$$D_{I,i_3}[k] \approx \frac{|z_{I,i}[k]| - \frac{8}{\sqrt{170}}}{4}\left(\frac{2}{\sqrt{170}} + \left|z_{I,i}[k]| - \frac{8}{\sqrt{170}}\right|\right) \tag{45}$$

$$D_{I,i_4}[k] \approx \frac{z_{I,i}[k]}{4}\left(\frac{2}{\sqrt{170}} + |z_{I,i}[k]|\right) \tag{46}$$

$$D_{Q,i_5}[k] = -\left|-\left|\frac{|z_{Q,i}[k]|}{\sqrt{170}} - \frac{8}{170}\right| + \frac{4}{170}\right| + \frac{2}{170} \tag{47}$$

$$D_{Q,i_6}[k] \approx -\frac{\left||z_{Q,i}[k]| - \frac{8}{\sqrt{170}}\right| - \frac{4}{\sqrt{170}}}{4} \cdot \tag{48}$$

$$\left(\frac{2}{\sqrt{170}} + \left||z_{Q,i}[k]| - \frac{8}{\sqrt{170}}\right| - \frac{4}{\sqrt{170}}\right|\right)$$

$$D_{Q,i_7}[k] \approx \frac{|z_{Q,i}[k]| - \frac{8}{\sqrt{170}}}{4}\left(\frac{2}{\sqrt{170}} + \left|z_{Q,i}[k]| - \frac{8}{\sqrt{170}}\right|\right) \tag{49}$$

$$D_{Q,i_8}[k] \approx \frac{z_{Q,i}[k]}{4}\left(\frac{2}{\sqrt{170}} + |z_{Q,i}[k]|\right) \tag{50}$$

1024-QAM $$D_{I,i_1}[k] = -\left|-\left|-\left|\frac{|z_{I,i}[k]|}{\sqrt{682}} - \frac{16}{682}\right| + \frac{8}{682}\right| + \frac{4}{682}\right| + \frac{2}{682} \tag{51}$$

$$D_{I,i_2}[k] \approx -\frac{\left|\left||z_{I,i}[k]| - \frac{16}{\sqrt{682}}\right| - \frac{8}{\sqrt{682}}\right| - \frac{4}{\sqrt{682}}}{4} \cdot \tag{52}$$

$$\left(\frac{2}{\sqrt{682}} + \left|\left||z_{I,i}[k]| - \frac{16}{\sqrt{682}}\right| - \frac{8}{\sqrt{682}}\right| - \frac{4}{\sqrt{682}}\right|\right)$$

$$D_{I,i_3}[k] \approx -\frac{\left||z_{I,i}[k]| - \frac{16}{\sqrt{682}}\right| - \frac{8}{\sqrt{682}}}{4} \cdot \tag{53}$$

$$\left(\frac{2}{\sqrt{682}} + \left||z_{I,i}[k]| - \frac{16}{\sqrt{682}}\right| - \frac{8}{\sqrt{682}}\right|\right)$$

-continued $$D_{I,i_4}[k] \approx \frac{z_{I,i}[k] - \frac{16}{\sqrt{682}}}{4} \cdot \left(\frac{2}{\sqrt{682}} + \left|z_{I,i}[k]\right| - \frac{16}{\sqrt{682}}\right|\right) \quad (54)$$

$$D_{I,i_5}[k] \approx \frac{z_{I,i}[k]}{4}\left(\frac{2}{\sqrt{682}} + |z_{I,i}[k]|\right) \quad (55)$$

$$D_{Q,i_6}[k] = -\left|-\left|-\left|\frac{|z_{Q,i}[k]|}{\sqrt{682}} - \frac{16}{682}\right| + \frac{8}{682}\right| + \frac{4}{682}\right| + \frac{2}{682} \quad (56)$$

$$D_{Q,i_7}[k] \approx -\frac{\left|\left||z_{Q,i}[k]| - \frac{16}{\sqrt{682}}\right| - \frac{8}{\sqrt{682}}\right| - \frac{4}{\sqrt{682}}}{4} \cdot$$

$$\left(\frac{2}{\sqrt{682}} + \left|\left||z_{Q,i}[k]| - \frac{16}{\sqrt{682}}\right| - \frac{8}{\sqrt{682}}\right| - \frac{4}{\sqrt{682}}\right|\right) \quad (57)$$

$$D_{Q,i_8}[k] \approx -\frac{\left||z_{Q,i}[k]| - \frac{16}{\sqrt{682}}\right| - \frac{8}{\sqrt{682}}}{4} \cdot$$

$$\left(\frac{2}{\sqrt{682}} + \left||z_{Q,i}[k]| - \frac{16}{\sqrt{682}}\right| - \frac{8}{\sqrt{682}}\right|\right) \quad (58)$$

$$D_{Q,i_9}[k] \approx \frac{|z_{Q,i}[k]| - \frac{16}{\sqrt{682}}}{4}\left(\frac{2}{\sqrt{682}} + \left||z_{Q,i}[k]| - \frac{4}{\sqrt{682}}\right|\right) \quad (59)$$

$$D_{Q,i_{10}}[k] \approx \frac{z_{Q,i}[k]}{4}\left(\frac{2}{\sqrt{682}} + |z_{Q,i}[k]|\right) \quad (60)$$

Those skilled in the art will appreciate that the illustrated method in which the nonlinear parametric function is a parabolic function (hereafter referred as a parabolic method) could be also employed with slight modifications when minor changes occur, due for instance to different Gray patterns, normalization constants or other factors. In particular, it is possible to modify the signs of some of the equations from (37) to (60) and their order (i.e., the association among some equations and the bits) depending on the particular Gray pattern used. Furthermore, the normalization constants may change if different constellation powers are employed.

Figure 3A:
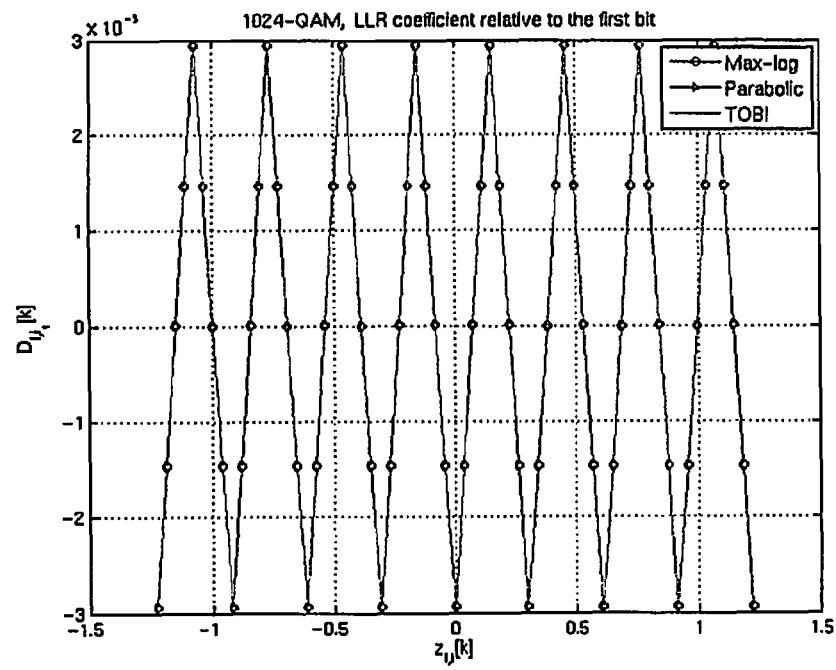
FIGS. 3a and 3b are graphs of LLR for first and second in-phase bits, respectively, of the 1024-QAM modulation obtained with the Max-Log and TOBI methods and with a method according to the present invention.
Figure 3B:
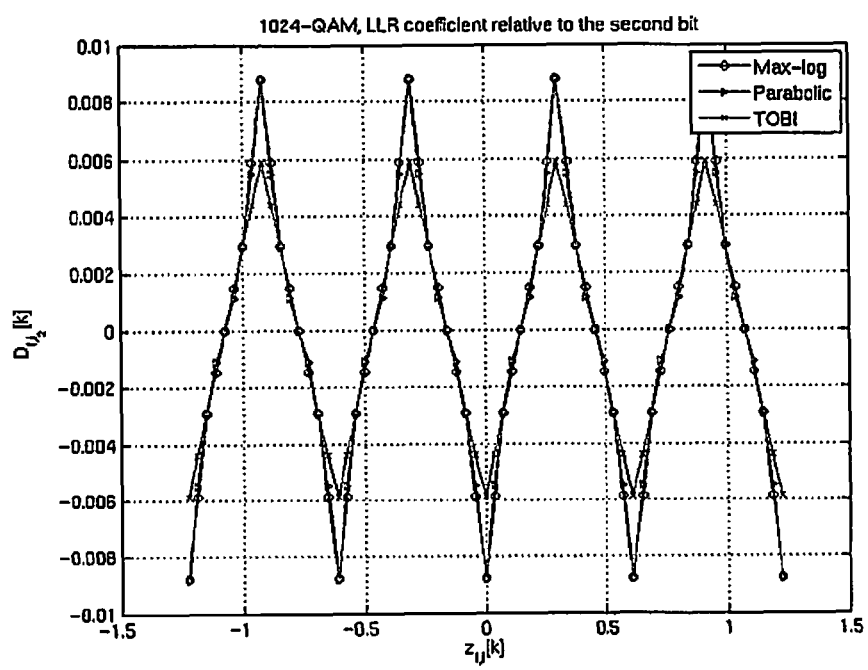
Figure 4A:
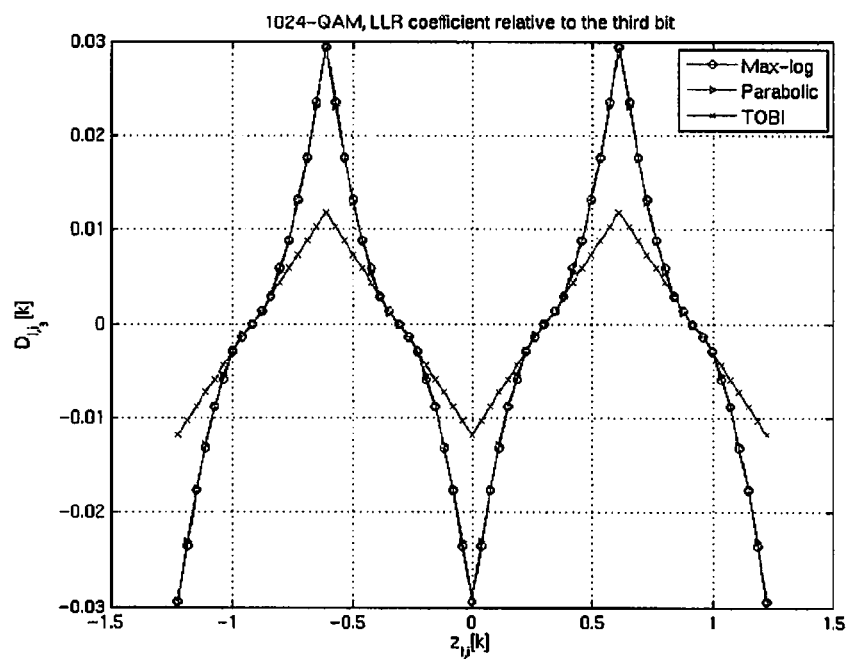
FIGS. 4a and 4b are graphs of LLR for third and fourth in-phase bits, respectively of the 1024-QAM modulation obtained with the Max-Log and TOBI methods and with a method according to the present invention.
Figure 4B:
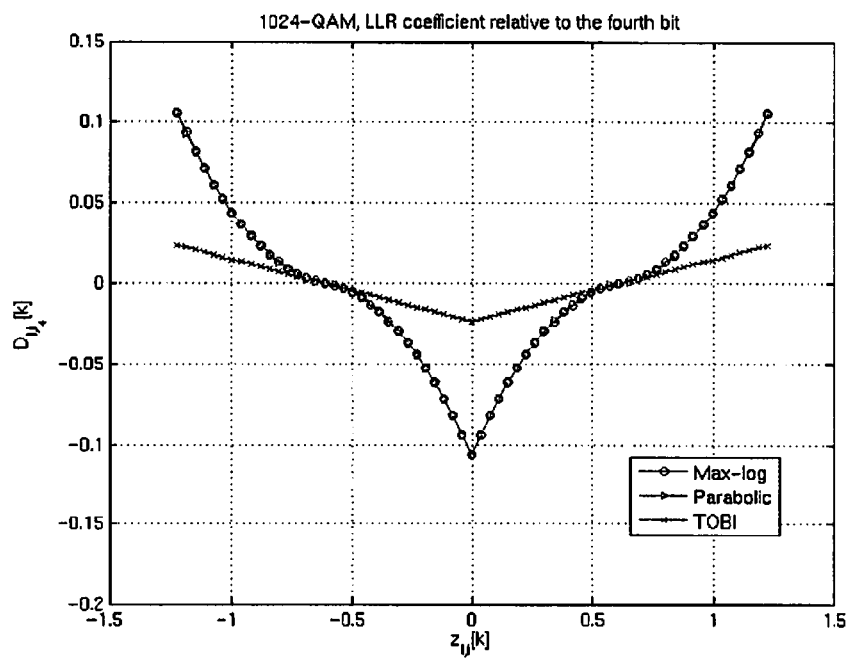
Figure 5:
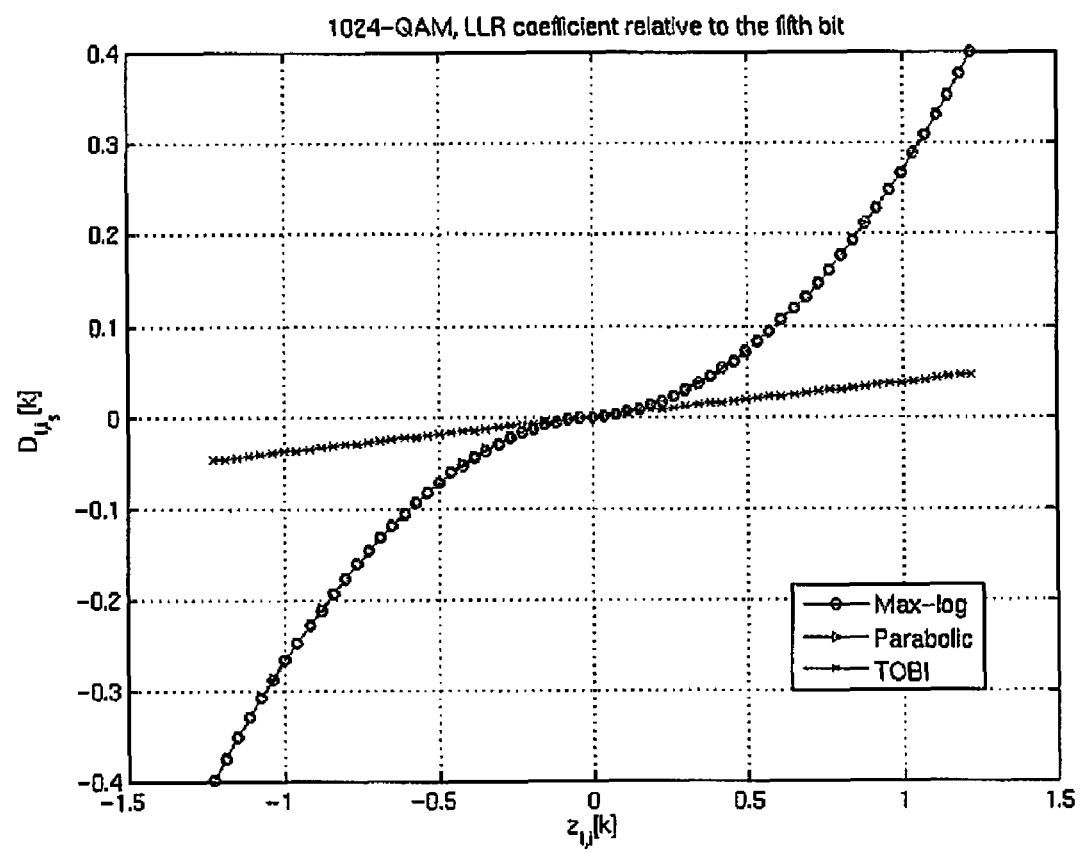
FIG. 5 is a graph of LLR for a fifth in-phase bit of the 1024-QAM modulation obtained with the Max-Log and TOBI methods and with a method according to the present invention.

From FIGS. 3 to 5 the $D_{I,i}[k]$ values, relative to the in-phase bits, are depicted for the 1024-QAM modulation, with a comparison among the three methods. The parabolic method gives an approximation to the optimum Max-Log method which is closer than the TOBI method. In fact, the curves obtained with the Max-Log method and the parabolic method are practically superimposed. A similar trend is observed also for the variable $D_{Q,i}[k]$, relative to the quadrature bits, and for the 64-QAM and the 256-QAM modulations (curves not shown). It will be shown that performances of the above illustrated method are better in terms of bit error rate (BER) versus the received SNR than those obtainable with the TOBI method.

Figure 6:
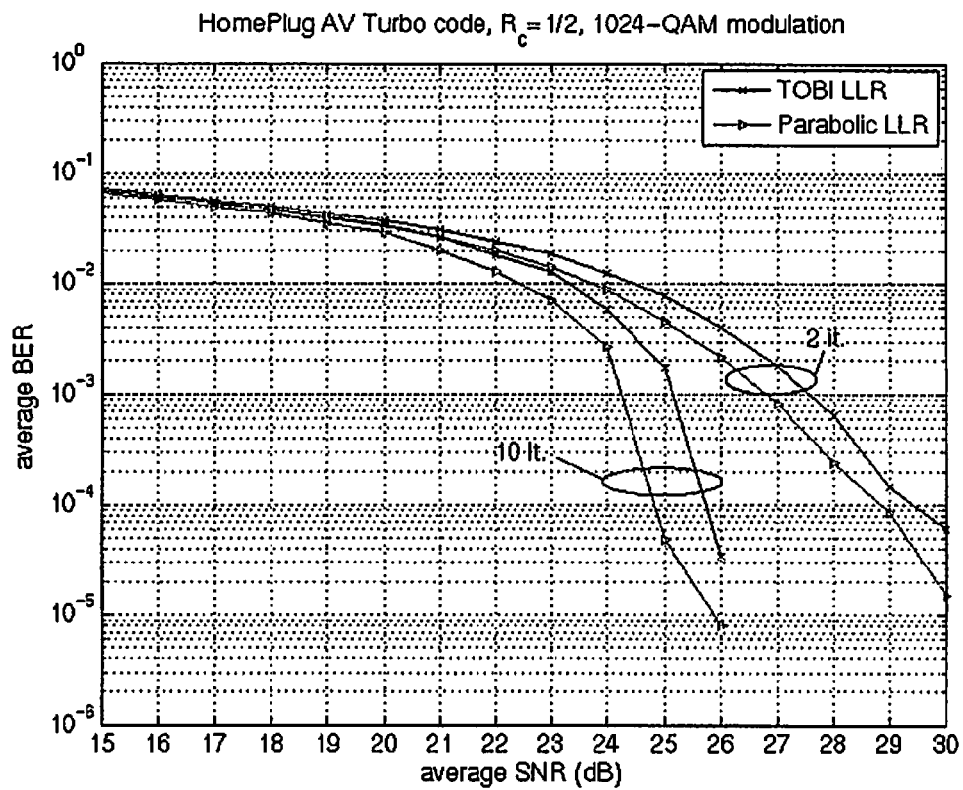
FIG. 6 depicts graphs of the average bit-error rate (BER) as a function of the average received signal-to-noise ratio (SNR), over a power-line channel for the 1024-QAM modulation, for comparing turbo code performance with two different methods (TOBI vs. a method according to the present invention) to estimate the input LLRs to the decoder after two iterations (2 it.) and ten iterations (10 it.)

For instance, in FIG. 6 results are reported for the rate ½ HomePlug AV Turbo code over a typical power line channel [27] after two and ten turbo iterations when an improved Max-Log MAP turbo decoder is used [28]. At a BER=$10^{-3}$, the parabolic method gives a gain of 0.75 dB after two turbo iterations. A further improvement of 0.2 dB is obtained after ten turbo iterations. We note that the performance improvement, with respect to the TOBI method, is obtained at the cost of a greater computational complexity. However, curves obtained with the parabolic method, for a much lower complexity, are almost superimposed to that obtained with the Max-Log method (curves not shown in FIG. 6).

Figure 7:
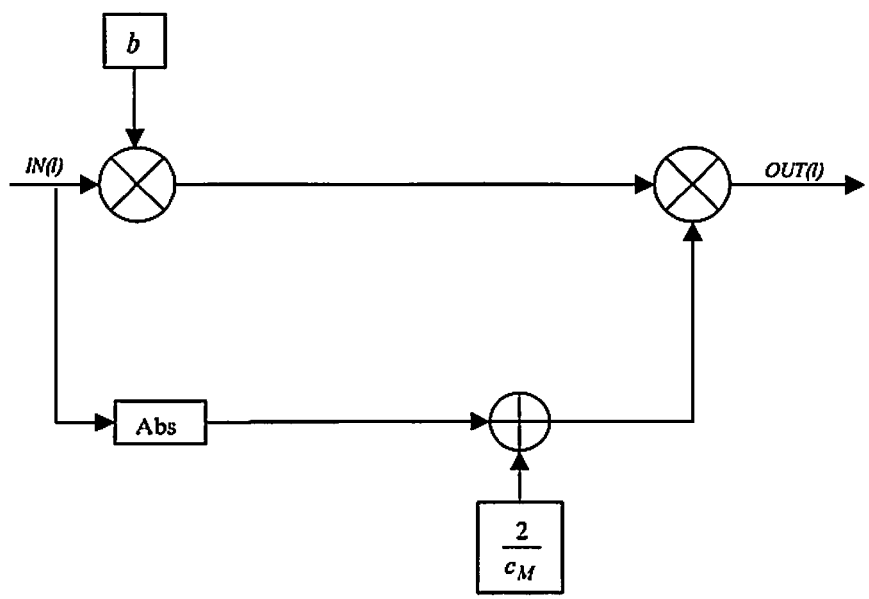
FIG. 7 shows the architecture of a basic circuit for the computation of the variables $D_{I_l}(k)$ for $l>1$ the method according to the present invention.

It is worth highlighting certain features of the embodiment described by equations (37) to (60):

i) the $D_{I,i_l}(k)$ and the $D_{Q,i_l}(k)$ expressions for the in-phase and quadrature LLR term are identical if the real part of the channel de-interleaved modulation symbol $z_{I,i}[k]$ is replaced by the imaginary part $z_{Q,i}[k]$. This feature was already present with the Max-Log and TOBI methods;

ii) the $D_{I,i_l}(k)$ terms with l=1 are the same in the three methods, since a close expression for the Max-Log method exists;

iii) the parabolic terms $D_{I,i_l}(k)$ with l>1 can be simply implemented with a circuit like the one depicted in FIG. 7. The parameter $c_M$ depends on the modulation order M and is a normalization factor that can be computed in advance. In the case of the HomePlug AV system, it is $c_M=\sqrt{42}$ for the 64-QAM modulation, $c_M=\sqrt{170}$ for the 256-QAM modulation and $c_M=\sqrt{682}$ for the 1024-QAM modulation. The second parameter b, for the particular embodiment that has been considered, is equal to ¼;

iv) the inputs to the circuit show a recursive behavior. For instance, choosing a 1024-QAM modulation and denoting by IN(l) the circuit input which produces the $D_{I,i_l}(k)$ term (OUT(l)), we obtain the following equations:

$$IN(5) = z_{I,i}[k] \quad (61)$$

$$IN(4) = |IN(5)| - \frac{2^4}{c_M} \quad (62)$$

$$IN(3) = -\left(|IN(4)| - \frac{2^3}{c_M}\right) \quad (63)$$

$$IN(2) = -\left(|IN(3)| - \frac{2^2}{c_M}\right) \quad (64)$$

The same set of equations (and circuit), starting with $IN(10)=z_{Q,i}[k]$, yields the $D_{Q,i_l}(k)$ terms. The equations for the 64-QAM and the 256-QAM constellations present a similar recursive regular behavior. Minor changes are required for communication systems using higher order QAM modulations with different Gray coded patterns and normalization factors.

Another aspect of the invention is directed to implementing the illustrated method in a soft-output de-mapper of a communication system for the 1024-QAM modulation (equations (9) and (10) and equations from (51) and (60)), or for the 256-QAM modulation (equations (9) and (10) and equations from (43) to (50)), or for the 64-QAM modulation (equations (9) and (10) and equations from (37) to (42)).

Yet another aspect of the invention is directed to a communication system which uses a soft-output de-mapper that implements the TOBI method for lower-order constellations (e.g., BPSK, QPSK, 8-QAM, 16-QAM), and the illustrated method for higher-order constellations (64-QAM, 256-QAM and 1024-QAM).

REFERENCES

[1] L. Hanzo, W. Webb and T. Keller, "Single- and multi-carrier quadrature amplitude modulation: principles and applications for personal communications, WLANs and broadcasting," Chichester, UK: Wiley, 2000.

[2] Berrou, A. Glavieux and P. Thitimashimajshima, "Near Shannon limit error-correcting coding and decoding: Turbo-codes I," IEEE ICC 1993, pp. 1064-1070, May 1993.

[3] R. M. Pyndiah, "Near-optimum decoding of product codes: block turbo codes," IEEE Trans. on Comm., vol. 46, pp. 1003-1010, August 1998.

[4] S. Benedetto and G. Montorsi, "Serial concatenation of block and convolutional codes," IEEE Elect. Lett., vol. 32, pp. 887-888, May 1996.

[5] G. Caire, G. Taricco and E. Biglieri, "Bit-interleaved coded modulation," IEEE Trans. on Inf. Theory, vol. 44, pp. 927-946, May 1998.

[6] G. Ungerboeck, "Channel coding with multilevel/phase signals," IEEE Trans. on Inf. Theory, vol. IT-28, pp. 55-67, January 1982.

[7] C. Douillard, M. Jézéquel and C. Berrou, "Iterative correction of intersymbol interference: Turbo-equalization," ETT, vol. 6, pp. 507-511, September-October 1995.

[8] G. Bauch, H. Khorram and J. Hagenauer, "Iterative equalization and decoding in mobile communications systems," EPMCC '97, Germany, pp. 307-312, September 1997.

[9] S. Kaiser and J. Hagenauer, "Multi-carrier CDMA with iterative decoding and soft-interference cancellation," IEEE GLOBECOM'97, pp. 6-10, November 1997.

[10] E. Biglieri, A. Nordio and G. Taricco, "Doubly iterative decoding of space-time turbo codes with a large number of antennas," IEEE Trans. On Comm., vol. 53, pp. 773-779, May 2005.

[11] E. Zehavi, "8-PSK trellis codes for a Rayleigh channel," IEEE Trans. On Comm., vol. 40, pp. 873-884, May 1992.

[12] R. Pyndiah, A. Picard and A. Glavieux, "Performance of block turbo coded 16-QAM and 64-QAM modulations," IEEE GLOBECOM '95, pp. 1039-1043, November 1995.

[13] N. Sindhushayana, "Method and apparatus for computing soft decision input metrics to a turbo decoder," U.S. Pat. No. 6,594,318 B1, Jul. 15, 2003.

[14] F. Tosato and P. Bisaglia, "Simplified soft-output demapper for binary interleaved COFDM with application to HIPERLAN/2", IEEE ICC 2002, pp. 664-668, May 2002.

[15] ETSI TS 101 475, "Broadband Radio Access Networks (BRAN); HIPERLAN type 2; Physical (PHY) layer, v1.2.2," 2001.

[16] HomePlug PowerLine Alliance, "HomePlug AV baseline specification," Version 1.0.00, December 2005.

[17] E. Akay and E. Ayanoglu, "Bit-interleaved coded modulation: low complexity decoding," VTC-spring 2004, pp. 328-332, May 2004.

[18] F. Tosato and P. Bisaglia, "QAM receiver and method for constellations having at least sixteen symbols," US patent 2004/0091058, May 2004.

[19] C.-W. Chang, P.-N. Chen and Y. S. Han, "A systematic bit-wise decomposition of M-ary symbol metric," IEEE Trans. On Wireless Comm., vol. 5, pp. 2742-2751, October 2006.

[20] E. Akay and E. Ayanoglu, "Low complexity decoding of BICM STBC," VTC-spring 2005, pp. 715-718, June 2005.

[21] L. Qiang, D. Peng and B. Guangguo, "Generalized soft decision metric generation for MPSK/MQAM without noise variance knowledge," IEEE PIMRC 2003, pp. 1027-1030, September 2003.

[22] S. Keller and R. Oome, "Apparatus and method for decoding a bit sequence from QPSK or QAM symbols," US patent 2005/0259765, November 2005.

[23] A. Doufexi, S. Armour, A. Nix and D. Bull, "A Comparison of HIPERLAN/2 and IEEE 802.11a physical and MAC layers," SCVT '2000, pp. 14-20.

[24] J. Lorincz and D. Begusic, "Physical layer analysis of emerging IEEE 802.11n WLAN standard," ICACT 2006, pp. 189-194, February 2006.

[25] A. Ghosh, D. R. Wolter, J. G. Andrews and R. Chen, "Broadband wireless access with WiMax/802.16: current performance benchmarks and future potential," IEEE Comm. Magazine, pp. 129-136, February 2005.

[26] "HomePlug AV white paper," http://www.homeplug.org.

[27] H. Philips, "Modeling of powerline communication channels," ISPLC 1996, pp. 724-728, Nov. 1996.

[28] J. Vogt and A. Finger, "Improving the max-log MAP turbo decoder," IEEE Elect. Lett., vol. 36, pp. 1937-1938, November 2000.

That which is claimed:

1. A method of approximating log-likelihood ratios for a plurality of encoded bits, the method comprising:

receiving the plurality of encoded bits modulated with a $2^m$-ary QAM constellation, with each symbol of the constellation being identified by a respective string of m bits;

approximating the log-likelihood ratio of each bit of the m bits with a product $\lambda$ of a respective factor by a respective variable D that depends on a received signal and on communication channel characteristics, the approximating comprising determining a value of at least one of the variables D using a parametric nonlinear function of an equalized replica z of a respective received signal; and providing de-interleaved modulation symbols based on the approximated log-likelihood ratios.

2. The method of claim 1, wherein the nonlinear parametric function is a parabolic function of at least one of an in-phase component $z_I$ and a quadrature component $z_Q$ of the equalized replica z of the respective received signal.

3. The method of claim 2, wherein m is an even number, with a first half of the m bits being transmitted in phase and with a second half of the m bits being transmitted in quadrature, with the values of the variables D for each bit of the bits modulated in-phase or in quadrature being determined through the following:

establishing a value of the variable for a first bit of the first half of the m bits or of the second half of the m bits as a linear function of an absolute value of the in-phase component $z_I$ or of the quadrature component $z_Q$ of the equalized replica z of the respective received signal; and calculating a value of each variable $D_{I,t}$ or $D_{Q,t}$ of the other bits of the first half of the m bits or of the second half of the m bits, respectively, using the parametric parabolic function of an equalized replica $z_I$ or $z_Q$ of the respective received signal.

4. The method of claim 3, wherein the first bit is a most significant bit.

5. The method of claim 3, wherein a position of the first bit is established as a function of a Gray coding that associates the encoded bits to QAM modulation symbols.

6. The method of claim 1, wherein the respective factor is determined for each bit as a function of the characteristics of a used communication channel and of noise that corrupts signals transmitted through the communication channel.

7. The method of claim 3, wherein m is 6 or 8 or 10; and the values of the variables for a first bit of the first half of the m bits or of the second half of the m bits are calculated based on the following:

calculating a first auxiliary variable $IN_f(m/2)$ or $IN_e(m/2)$ equal to or opposite to a real part or to an imaginary part, respectively, of the equalized replica z of the respective received signal;

calculating a second auxiliary variable $IN_f(m/2-1)$ or $IN_e(m/2-1)$ equal to or opposite to a difference between an absolute value of the first auxiliary variable $IN_f(m/2)$ or $IN_e(m/2)$, respectively, and a ratio of a power $2^{m/2-1}$ by a first parameter $C_M$;

calculating a third auxiliary variable $IN_f(m/2-2)$ or $IN_e(m/2-2)$ opposite to or equal to a difference between an absolute value of the second auxiliary variable $IN_f(m/2-1)$ or $IN_e(m/2-1)$, respectively, and a ratio of a power $2^{m/2-2}$ by the first parameter $C_M$;

calculating, for m=8 or m=10, a fourth auxiliary variable $IN_f(m/2-3)$ or $IN_e(m/2-3)$ opposite to or equal to a difference between an absolute value of the third auxiliary variable $IN_f(m/2-2)$ or $IN_e(m/2-2)$, respectively, and a ratio of a power $2^{m/2-3}$ by the first parameter $c_M$; and calculating for m=10 a fifth auxiliary variable $IN_f(m/2-4)$ or $IN_e(m/2-4)$ opposite to or equal to a difference between an absolute value of the fourth auxiliary variable $IN_f(m/2-3)$ or $IN_e(m/2-3)$, respectively, and a ratio of a power $2^{m/2-4}$ by the first parameter $C_M$, the variable for a first bit of the first half of the m bits or of the second half of the m bits being equal to or opposite to a ratio of an (m/2)-th auxiliary variable $IN_f(.)$ or $IN_e(.)$, respectively, by the first parameter $C_M$.

8. The method of claim 7, wherein the parametric parabolic function calculates the value of each variable $D_{I,l}$ or $D_{Q,t}$ of the other bits of the first half of the m bits or of the second half of the m bits, respectively, as a product of an l-th or t-th auxiliary variable by a second parameter b and by a sum of a ratio $2/c_M$ of 2 by the first parameter $c_M$ with an absolute value of the l-th or t-th auxiliary variable, where $D_{I,l}$ and $D_{Q,t}$ are defined as follows:

$$D_{I,l} = b * IN_f(m/2-l+1) * [|IN_f(m/2-l+1)| + 2/c_M]$$

$$D_{Q,t} = b * IN_e(m/2-t+1) * [|IN_e(m/2-t+1)| + 2/c_M].$$

9. The method of claim 8, wherein the second parameter (b) is equal to ¼.

10. The method of claim 8, wherein the first parameter $c_M$ is established as a function of the number m of bits.

11. The method of claim 8, wherein the first parameter $c_M$ is established as a function of a constellation power.

12. The method of claim 8, wherein the number m of bits is 6 (64-QAM) and the first parameter $c_M$ is equal to SQRT(42).

13. The method of claim 8, wherein the number m of bits is 8 (256-QAM) and the first parameter $c_M$ is equal to SQRT(170).

14. The method of claim 8, wherein the number m of bits is 10 (1024-QAM) and the first parameter $c_M$ is equal to SQRT(682).

15. A de-mapper comprising:
an input to receive a plurality of encoded bits modulated with a $2^m$-ary QAM constellation, with each symbol of the constellation being identified by a respective string of m bits;
a circuit to approximate a log-likelihood ratio of each bit of the m bits with a product λ of a respective factor by a respective variable D that depends on a received signal and on communication channel characteristics, the approximating comprising determining a value of at least one of the variables D using a parametric nonlinear function of an equalized replica z of a respective received signal; and
an output to provide de-interleaved modulation symbols based on the approximated log-likelihood ratios.

16. The de-mapper of claim 15, wherein the nonlinear parametric function is a parabolic function of at least one of an in-phase component $z_I$ and a quadrature component $z_Q$ of the equalized replica z of the respective received signal.

17. The de-mapper of claim 16, wherein m is an even number, with a first half of the m bits being transmitted in phase and with a second half of the m bits being transmitted in quadrature, with the values of the variables D for each bit of the bits modulated in-phase or in quadrature being determined through the following:
establishing a value of the variable for a first bit of the first half of the m bits or of the second half of the m bits as a linear function of an absolute value of the in-phase component $z_I$ or of the quadrature component $z_Q$ of the equalized replica z of the respective received signal; and
calculating a value of each variable $D_{I,l}$ or $D_{Q,t}$ of the other bits of the first half of the m bits or of the second half of the m bits, respectively, using the parametric parabolic function of an equalized replica $z_I$ or $z_Q$ of the respective received signal.

18. The de-mapper of claim 17, wherein the first bit is a most significant bit; and wherein a position of the first bit is established as a function of a Gray coding that associates the encoded bits to QAM modulation symbols.

19. The de-mapper of claim 15, wherein the respective factor is determined for each bit as a function of the characteristics of a used communication channel and of noise that corrupts signals transmitted through the communication channel.

20. The de-mapper of claim 17, wherein m is 6 or 8 or 10; and the values of the variables for a first bit of the first half of the m bits or of the second half of the m bits are calculated based on the following:
calculating a first auxiliary variable $IN_f(m/2)$ or $IN_e(m/2)$ equal to or opposite to a real part or to an imaginary part, respectively, of the equalized replica z of the respective received signal;
calculating a second auxiliary variable $IN_f(m/2-1)$ or $IN_e(m/2-1)$ equal to or opposite to a difference between an absolute value of the first auxiliary variable $IN_f(m/2)$ or $IN_e(m/2)$, respectively, and a ratio of a power $2^{m/2-1}$ by a first parameter $C_M$;
calculating a third auxiliary variable $IN_f(m/2-2)$ or $IN_e(m/2-2)$ opposite to or equal to a difference between an absolute value of the second auxiliary variable $IN_f(m/2-1)$ or $IN_e(m/2-1)$, respectively, and a ratio of a power $2^{m/2-2}$ by the first parameter $C_M$;
calculating, for m=8 or m=10, a fourth auxiliary variable $IN_f(m/2-3)$ or $IN_e(m/2-3)$ opposite to or equal to a difference between an absolute value of the third auxiliary variable $IN_f(m/2-2)$ or $IN_e(m/2-2)$, respectively, and a ratio of a power $2^{m/2-3}$ by the first parameter $c_M$; and
calculating for m=10 a fifth auxiliary variable $IN_f(m/2-4)$ or $IN_e(m/2-4)$ opposite to or equal to a difference between an absolute value of the fourth auxiliary variable $IN_f(m/2-3)$ or $IN_e(m/2-3)$, respectively, and a ratio of a power $2^{m/2-4}$ by the first parameter $c_M$, the variable for a first bit of the first half of the m bits or of the second half of the m bits being equal to or opposite to a ratio of an (m/2)-th auxiliary variable respectively, by the first parameter $c_M$.

21. The de-mapper of claim 20, wherein the parametric parabolic function calculates the value of each variable $D_{I,l}$ or $D_{Q,t}$ of the other bits of the first half of the m bits or of the second half of the m bits, respectively, as a product of an l-th or t-th auxiliary variable by a second parameter b and by a sum of a ratio $2/c_M$ of 2 by the first parameter $c_M$ with an absolute value of the l-th or t-th auxiliary variable, where $D_{I,l}$ and $D_{Q,t}$ are defined as follows:

$$D_{I,l} = b * IN_f(m/2-l+1) * [|IN_f(m/2-l+1)| + 2/c_M]$$

$$D_{Q,t} = b * IN_e(m/2-t+1) * [|IN_e(m/2-t+1)| + 2/c_M].$$

22. A receiver comprising:
  an analog front end to receive a signal from a communication channel, the signal including a plurality of encoded bits modulated with a $2^m$-ary QAM constellation, with each symbol of the constellation being identified by a respective string of m bits;
  an automatic gain control and time synchronization block to adjust a level of the received signal, and to generate a first internal signal that is a replica of the received signal with a pre-established level;
  a demodulator input with the first internal signal to generate a digital signal $y_i$ that represents a replica of transmitted symbols $a_i$ distorted by the communication channel and corrupted by noise;
  a demapper input with the digital signal $y_i$ to generate second digital signals representing a product $\lambda$ associated to each bit of the distorted and corrupted replica $y_i$ of the transmitted symbols, the second digital signals being generated based on approximating the log-likelihood ratio of each bit of the m bits with a product $\lambda$ of a respective factor by a respective variable D that depends on the received signal and on communication channel characteristics, the approximating comprising determining a value of at least one of the variables D using a parametric nonlinear function of an equalized replica z of a respective received signal; and
  a decoder that processes the second digital signals and to decide as a function thereof which bits have been transmitted.

23. The receiver of claim 22, wherein said automatic gain control and time synchronization block (AGC & TIME SYNC) is to remove a cyclic prefix for eliminating inter-symbol and inter-channel interference; and wherein said demodulator comprises an OFDM demodulator.

24. The receiver of claim 22, wherein the nonlinear parametric function is a parabolic function of at least one of an in-phase component $z_I$ and a quadrature component $z_Q$ of the equalized replica z of the respective received signal.

25. The receiver of claim 23, wherein m is an even number, with a first half of the number m of bits being transmitted in phase and with a second half being transmitted in quadrature, with the values of the variables D for each bit of the bits modulated in-phase or in quadrature being determined through the following:
  establishing a value of the variable for a first bit of the first half of the m bits or of the second half of the m bits as a linear function of an absolute value of the in-phase component $z_I$ or of the quadrature component $z_Q$ of the equalized replica z of the respective received signal; and
  calculating a value of each variable $D_{I,l}$ or $D_{Q,t}$ of the other bits of the first half or of the second half, respectively, using the parametric parabolic function of an equalized replica $z_I$ or $z_Q$ of the respective received signal.

26. The receiver of claim 24, wherein the first bit is a most significant bit; and wherein a position of the first bit is established as a function of a Gray coding that associates the encoded bits to QAM modulation symbols.

27. The receiver of claim 22, wherein the respective factor is determined for each bit as a function of the characteristics of a used communication channel and of noise that corrupts signals transmitted through the communication channel.

28. The receiver of claim 24, wherein m is 6 or 8 or 10; and the values of the variables for a first bit of the first half of the m bits or of the second half of the m bits are calculated based on the following:
  calculating a first auxiliary variable $IN_f(m/2)$ or $IN_e(m/2)$ equal to or opposite to a real part or to an imaginary part, respectively, of the equalized replica z of the respective received signal;
  calculating a second auxiliary variable $IN_f(m/2-1)$ or $IN_e(m/2-1)$ equal to or opposite to a difference between an absolute value of the first auxiliary variable $IN_f(m/2)$ or $IN_e(m/2)$, respectively, and a ratio of a power $2^{m/2-1}$ by a first parameter $C_M$;
  calculating a third auxiliary variable $IN_f(m/2-2)$ or $IN_e(m/2-2)$ opposite to or equal to a difference between an absolute value of the second auxiliary variable $IN_f(m/2-1)$ or $IN_e(m/2-1)$, respectively, and a ratio of a power $2^{m/2-2}$ by the first parameter $C_M$;
  calculating, for m=8 or m=10, a fourth auxiliary variable $IN_f(m/2-3)$ or $IN_e(m/2-3)$ opposite to or equal to a difference between an absolute value of the third auxiliary variable $IN_f(m/2-2)$ or $IN_e(m/2-2)$, respectively, and a ratio of a power $2^{m/2-3}$ by the first parameter $C_M$; and
  calculating for m=10 a fifth auxiliary variable $IN_f(m/2-4)$ or $IN_e(m/2-4)$ opposite to or equal to a difference between an absolute value of the fourth auxiliary variable $IN_f(m/2-3)$ or $IN_e(m/2-3)$, respectively, and a ratio of a power $2^{m/2-4}$ by the first parameter $C_M$, the variable for a first bit of the first half of the m bits or of the second half of the m bits being equal to or opposite to a ratio of an (m/2)-th auxiliary variable $IN_f(.)$ or $IN_e(.)$, respectively, by the first parameter $C_M$.

29. The receiver of claim 28, wherein the parametric parabolic function calculates the value of each variable $D_{I,l}$ or $D_{Q,t}$ of the other bits of the first half of the m bits or of the second half of the m bits, respectively, as a product of an l-th or t-th auxiliary variable by a second parameter b and by a sum of a ratio $2/c_M$ of 2 by the first parameter $c_M$ with an absolute value of the l-th or t-th auxiliary variable, where $D_{I,l}$ and $D_{Q,t}$ are defined as follows:

$$D_{I,l} = b * IN_f(m/2-l+1) * [|IN_f(m+2-l+1)| + 2/c_M]$$

$$D_{Q,t} = b * IN_e(m/2-t+1) * [|IN_e(m/2-t+1)| + 2/c_M].$$

* * * * *

UNITED STATES PATENT AND TRADEMARK OFFICE
CERTIFICATE OF CORRECTION

PATENT NO. : 8,019,024 B2
APPLICATION NO. : 12/051146
DATED : September 13, 2011
INVENTOR(S) : Guerrieri et al.

It is certified that error appears in the above-identified patent and that said Letters Patent is hereby corrected as shown below:

Column 2, line 40

Delete: " $\{a=a_I+ja_Q\}$ "

Insert: -- $\{\alpha = \alpha_I + j\alpha_Q\}$ --

Column 2, lines 46-47

Delete: " $\{c_{i_{m/2-1}}[k], c_{i_{m-2}}[k], ..., c_{i_0}[k]\}$ "

Insert: -- $\{c_{i_{m/2-1}}[k], c_{i_{m/2-2}}[k], ..., c_{i_0}[k]\}$ --

Column 3, line 5

Delete: " $\lambda_{il_i}[k] \approx \left( \min_{\alpha \in S_i^{(0)}}(w_i[k]^2) - \min_{\alpha \in S_i^{(1)}}(w_i[k]^2) \right) \frac{|G_i[k]|^2}{2\sigma^2}$ "

Insert: -- $\lambda_{l_i}[k] \approx \left( \min_{\alpha \in S_i^{(0)}}(w_i[k]^2) - \min_{\alpha \in S_i^{(1)}}(w_i[k]^2) \right) \frac{|G_i[k]|^2}{2\sigma^2}$ --

Column 4, line 19

Delete: "referred to the"

Insert: --referred to as the--

Column 9, line 25

Delete: " $D_{Q,l_0}[k] \approx \dfrac{\dfrac{|z_{Q,i}[k]|}{\sqrt{682}} - \dfrac{16}{\sqrt{682}}}{4} \left( \dfrac{2}{\sqrt{682}} + \left| \dfrac{|z_{Q,i}[k]|}{\sqrt{682}} - \dfrac{4}{682} \right| \right)$ "

Insert: -- $D_{Q,l_0}[k] \approx \dfrac{\dfrac{|z_{Q,i}[k]|}{\sqrt{682}} - \dfrac{16}{682}}{4} \left( \dfrac{2}{\sqrt{682}} + \left| \dfrac{|z_{Q,i}[k]|}{\sqrt{682}} - \dfrac{4}{682} \right| \right)$ --

Signed and Sealed this
Seventeenth Day of July, 2012

David J. Kappos
*Director of the United States Patent and Trademark Office*

CERTIFICATE OF CORRECTION (continued)
U.S. Pat. No. 8,019,024 B2

Column 9, line 43   Delete: "$D_{I,i_l}[k]$"

Insert: -- $D_{I,i_l}[k]$ --

Column 9, line 50   Delete: "$D_{Q,i_l}[k]$"

Insert: -- $D_{Q,i_l}[k]$ --

Column 13, line 30   Delete: "$D_{Qt}$"

Insert: -- $D_{Q,t}$ --

Column 14, line 40   Delete: "$2^{m2-1}$"

Insert: -- $2^{m/2-1}$ --

Column 15, line 2,   Delete: "$D_{Qt}$"

Insert: -- $D_{Q,t}$ --

Column 15, line 46   Delete: "number"

Column 16, line 50   Delete: "$D_{Qt}$"

Insert: -- $D_{Q,t}$ --